UNITED STATES PATENT OFFICE.

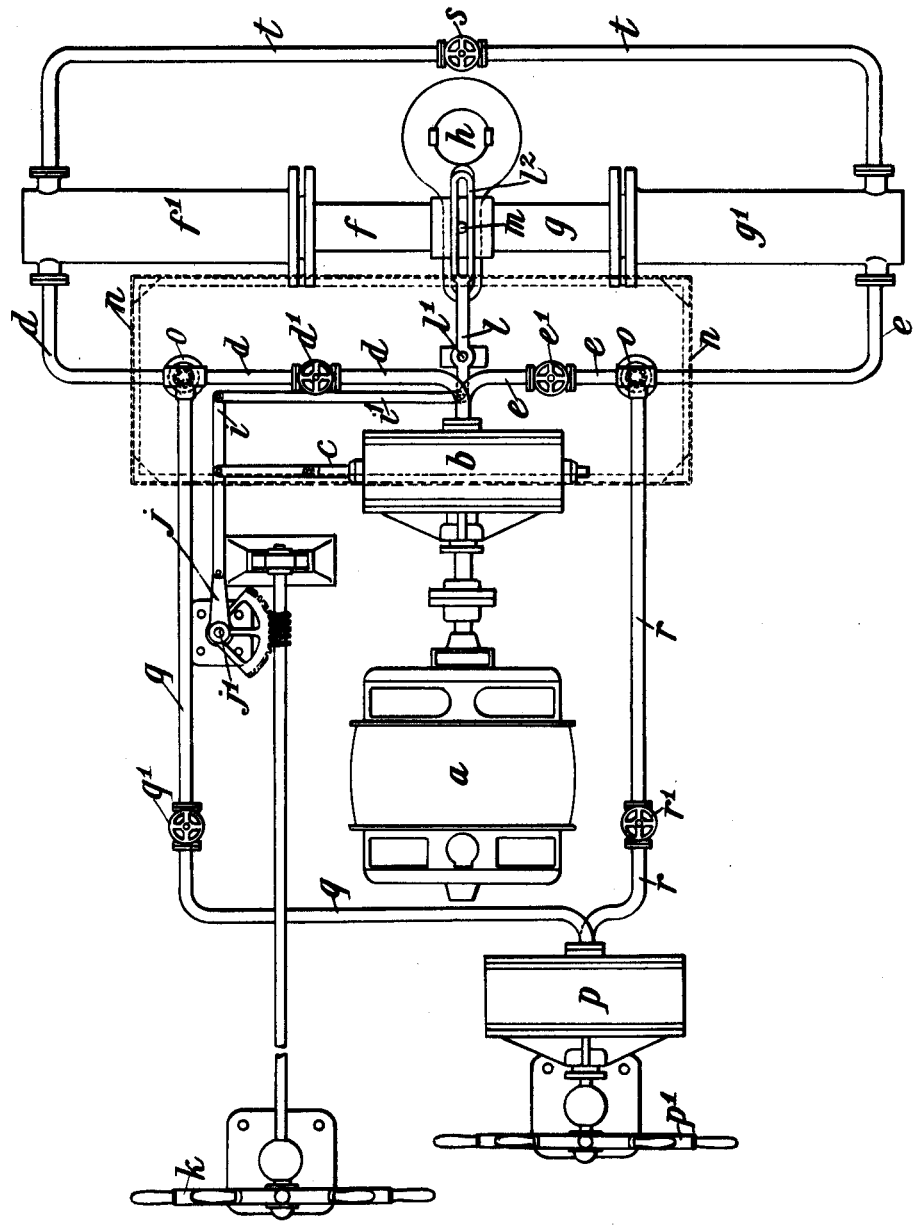

FRANCIS LEIGH MARTINEAU, OF LONDON, ENGLAND.

HYDRAULIC STEERING-GEAR.

1,056,194.  Specification of Letters Patent.  Patented Mar. 18, 1913.

Application filed April 25, 1910. Serial No. 557,587.

*To all whom it may concern:*

Be it known that I, FRANCIS LEIGH MARTINEAU, a subject of the King of Great Britain, residing at London, in the county of London, England, have invented a new and useful Improvement in Hydraulic Steering-Gear, of which the following is a specification.

This invention relates to a new or improved marine steering gear, and has for its object to provide an effective hydraulic apparatus controlled from the steering wheel of a ship, by means of which the ship's rudder is operated to effect the steering of the vessel.

My invention consists essentially of a variable stroke reversible pump associated with a continuously rotating electric or other motor and so controlled that hydraulic rams connected to the rudder are operated so as to cause the rudder to take up the correct angle when the steering wheel is operated and remain at that angle until the steering wheel is again rotated. And in order that my invention may be more readily understood and carried into practice, reference is hereby made to the accompanying drawing which illustrates diagrammatically a simple example of a complete steering gear constructed in accordance with my invention.

Referring to this drawing $a$ designates a continuously driven electric or other motor which is coupled to drive continuously the cylinder body of the pump $b$ which is preferably of the form set forth in the specification of British Letters Patent No. 12574 of 1909, the stroke of which pump is set and regulated by the movement of a ring connected to the push rod $c$. That is to say, the movement of the rod $c$ causes a ring within the pump to be set in positions of varying degrees of eccentricity to the primary axis of the pump and thus the stroke of the pump is varied. Moreover the direction in which liquid is discharged from the pump is also dependent on the position of the said eccentric ring. The inlet and outlet orifices of the pump $b$ are connected by means of the pipes $d$ and $e$ with the cylinders $f^1$ and $g^1$ of the rams $f$ and $g$ which are suitably connected to the rudder head $h$.

The stroke varying rod $c$ of the pump $b$ is pivotally connected to a lever $i$, and this lever $i$ is connected to one arm of a bell crank lever $j$ movable on a fixed pivot $j^1$, the other arm of the bell crank lever $j$ taking the form of a worm quadrant operated by a worm rotating with the steering wheel $k$. The end of the lever $i$ remote from the bell crank $j$ is pivotally connected by a link $i^1$ to a lever $l$ movable about a fixed pivot $l^1$ and this lever $l$ has a slotted end $l^2$ in which a pin $m$ fixed upon and moving with the rams $f$ and $g$ is located.

In order to provide for any leakage which may occur in the pump system, pipes or ducts are led from both the pipe connections between the pump and the two rams to a liquid containing tank or reservoir $n$, and the ends of the pipes within this tank or reservoir are each provided with a non-return valve $o$.

The operation of the gear is as follows:—
The motor $a$ is continuously rotated but normally no liquid is circulated owing to the eccentric ring of the pump $b$ being normally in position concentric with the primary axis of the pump. If the steering wheel $k$ is rotated the bell crank lever $j$ will be turned about its pivot and the lever $i$ will move carrying with it the rod $c$ connected to the stroke setting and varying ring of the pump $b$. By this means the pump will be given a stroke and will commence to discharge liquid under pressure through one or other of the pipes $d$ or $e$ according, of course, to the direction in which the steering wheel is rotated. Thus one of the rams $f$ or $g$ will be actuated and the rudder will thus be given the desired angle. The movement of the rams will cause the lever $l$ to be turned about its pivot $l^1$ by reason of the engagement of the pin $m$ in its slotted end $l^2$, and thus through the agency of the levers $i^1$ and $i$, the rod $c$ is moved back again to its normal position and the pump $b$ ceases to transmit liquid, and the rudder remains in the set position until the steering wheel $k$ is again operated. It will be clear that if the steering wheel $k$ is now rotated to the same extent in the opposite direction the rudder will be returned to its original position. I may of course employ a telemotor to operate the rod $c$ to impart stroke to the pump $b$ in a similar way to that in which such apparatus is now ordinarily employed to operate the valves of steam steering apparatus. I also provide means whereby the rudder can be operated by manual effort alone, the power being transmitted hydraulically. In order to effect this I provide a second pump $p$ driven directly from the secondary steering wheel $p^1$. This pump is connected up to the original circuit by the pipes $q, r$ thus constituting a new circuit worked by the aforesaid pump $p$. It is essential that only one of the two circuits be closed at any time and therefore stop-valves $d^1$, $e^1$, $q^1$ and $r^1$ are provided by which either of the said circuits may be brought into use as required.

In order to employ the power circuit, it is necessary to shut down the valves $q^1$ and $r^1$ and open the valves $d^1$ and $e^1$. Liquid can then flow from the pump $b$ through the pipes $d$ and $e$ of the first circuit, but is prevented from flowing in the pipes $q$ and $r$ of the second. When it is desirable or necessary to employ the hand operated gear the valves $d^1$ and $e^1$ are shut down and the valves $q^1$ and $r^1$ opened. Liquid can then flow by way of the pipes $q, r, d$ and $e$ to the rams $f$ and $g$, but is prevented by the closed valves $d^1$ and $e^1$ from flowing to the pump $b$. A stop valve $s$ is provided in the pipe $t$ which connects the cylinders $f^1$ and $q^1$. When the apparatus is working this valve must be kept closed, otherwise there will be a free flow of liquid therethrough and no power would be transmitted to the rams. The objects of this valve are, first, to allow a free circulation of liquid during the charging of the system and thus render it possible to expel all the air from the pipes by continued circulation of liquid and secondly to permit of the rudder being returned to the zero position should the power driven gear become disabled while the ship has any helm.

It will be seen that the device of my invention is designed for operating on or controlling a rudder which in its normal position is subjected to resistance against movement and which in a shifted position is adapted to be moved because of the impact or action of the water thereagainst. In the normal position of the rudder the same is in an equilibrium of pressure on both sides whereas in a shifted position the rudder is acted upon with greater force on one side than the other.

What I claim and desire to secure by Letters Patent is:—

1. In a ship steering gear comprising a rudder post and steering wheel, the combination of a fluid pressure motor operatively connected to said rudder post, a continuously operating variable stroke reversible pump for supplying motive fluid to actuate said motor, and a floating gear having operative connection with said wheel, motor and pump whereby a movement of the wheel initiates a flow of fluid from the pump to the motor and movement of the motor will act to terminate such flow of fluid.

2. In a ship steering gear comprising a rudder post and steering wheel, the combination of a fluid pressure motor operatively connected with said rudder post, a continuously operating pump for supplying motive fluid to actuate said motor, said pump having adjusting means for reversing and varying the stroke, a floating gear having operative connection with said pump adjusting means and a worm connection with said wheel, and a lever actuated by said pressure motor and operatively connected with said floating gear whereby the wheel will move and lock the pump adjusting means and initiate a flow of fluid from the pump to the motor and movement of the motor will actuate said lever to shift the gear and terminate the flow of fluid to lock the rudder post.

3. In a ship steering gear comprising a rudder post and steering wheel, the combination of a fluid pressure motor operatively connected to said rudder post, a continuously operating pump for supplying motive fluid to actuate said motor, said pump having adjusting means for reversing and varying the stroke, and a floating gear having a worm connection with said wheel and operatively connected with said motor and pump adjusting means whereby a movement of the wheel will move and lock the pump adjusting means and initiate a flow of liquid from the pump to the motor and movement of the motor will act to terminate the flow of fluid.

4. In a steering system, a steering mechanism, a motor adapted to be run constantly in one direction, a reversible, variable fluid delivery pump, means for constantly driving said pump from said motor, a reversible fluid motor operatively connected so as to be variably and reversibly driven by the delivery of said pump, means operatively connecting said steering mechanism with said fluid motor and means for reversing and varying the operation of said pump.

5. In a steering system, a steering mechanism, a source of power adapted to be run constantly in one direction, a reversible, variable fluid delivery pump, means for constantly driving said pump from said source of power, a reversible fluid motor operatively connected so as to be variably driven in either phase of motion by the delivery of said pump, means operatively connecting said steering mechanism with said fluid motor and adjustable means for progressively varying the amount of liquid delivered in either phase and for reversing the phase by a continued adjustment of said means in the one direction.

In testimony whereof I have affixed my signature in presence of two witnesses.

FRANCIS LEIGH MARTINEAU.

Witnesses:
    AUGA A. THORNTON,
    RIPLEY WILSON.